United States Patent [19]

Takemae

[11] Patent Number: 4,734,727
[45] Date of Patent: Mar. 29, 1988

[54] BRACKETING EXPOSURE CONTROL CAMERA

[75] Inventor: Mikio Takemae, Yokohama, Japan

[73] Assignee: Nippon Kogaku K. K., Tokyo, Japan

[21] Appl. No.: 808,732

[22] Filed: Dec. 13, 1985

[30] Foreign Application Priority Data

Dec. 21, 1984 [JP] Japan .................................. 59-270050

[51] Int. Cl.[4] ........................... G03B 7/00; G03B 1/66
[52] U.S. Cl. .................................... 354/412; 354/442; 354/173.1; 354/217
[58] Field of Search ............... 354/410, 412, 442, 458, 354/217, 218, 441, 443, 173.1, 173.11; 352/175, 170-172

[56] References Cited

U.S. PATENT DOCUMENTS

| | | | |
|---|---|---|---|
| 3,404,614 | 10/1968 | Naumann | 354/217 |
| 3,762,285 | 11/1973 | Tenkumo | 95/10 |
| 3,776,625 | 12/1973 | Fountain | 352/170 |
| 4,021,828 | 5/1977 | Iura et al. | 354/217 |
| 4,105,310 | 8/1978 | Hirata et al. | 352/171 |
| 4,311,377 | 1/1982 | Matteson | 354/217 |

FOREIGN PATENT DOCUMENTS

| | | | |
|---|---|---|---|
| 22824 | 2/1979 | Japan | 354/217 |
| 139732 | 10/1979 | Japan | 354/442 |
| 136633 | 8/1982 | Japan | 354/217 |
| 223138 | 12/1983 | Japan | 354/217 |
| 214827 | 12/1984 | Japan | 354/442 |

Primary Examiner—W. B. Perkey
Attorney, Agent, or Firm—Shapiro and Shapiro

[57] ABSTRACT

A bracketing exposure control camera is structured in such a manner that a preset number of frames for bracketing photography is compared with the actual number of frames exposed so far in bracketing photography and exposure control operation is forcibly stopped upon detecting that the preset number of frames has been exposed. The bracketing exposure control camera can perform bracketing photography of a plurality of frames with a motor drive device, and will not waste film when the operator continues to depress the shutter release button after bracketing photography has been completed.

8 Claims, 23 Drawing Figures

FIG. 5A SIG. a
FIG. 5B SIG. b
FIG. 5C SIG. c

FIG. 5D SIG. d
FIG. 5E SIG. e
FIG. 5F SIG. f
FIG. 5G SIG. g $t_1$ $t_2$ $t_3$ $t_4$ $t_5$

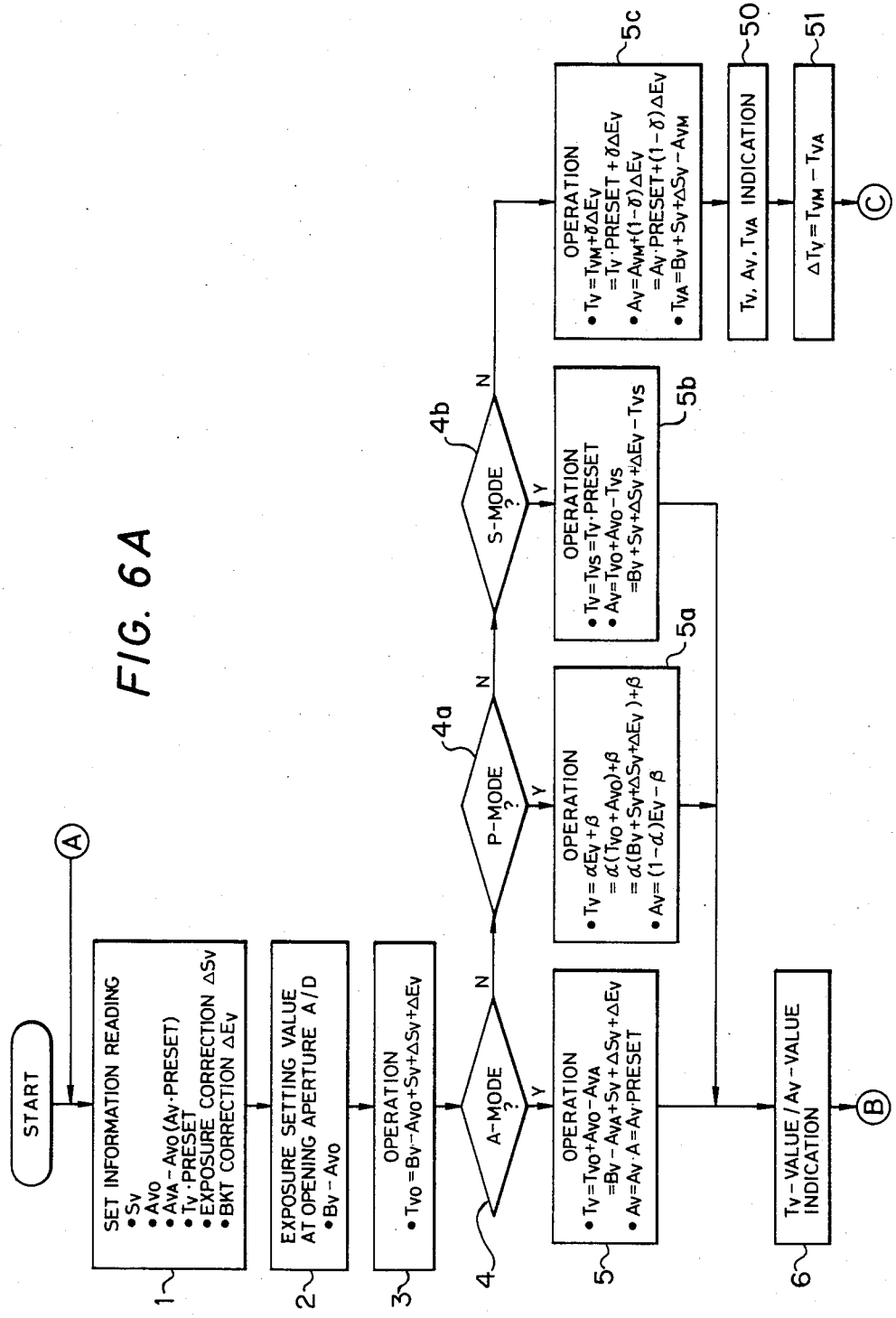

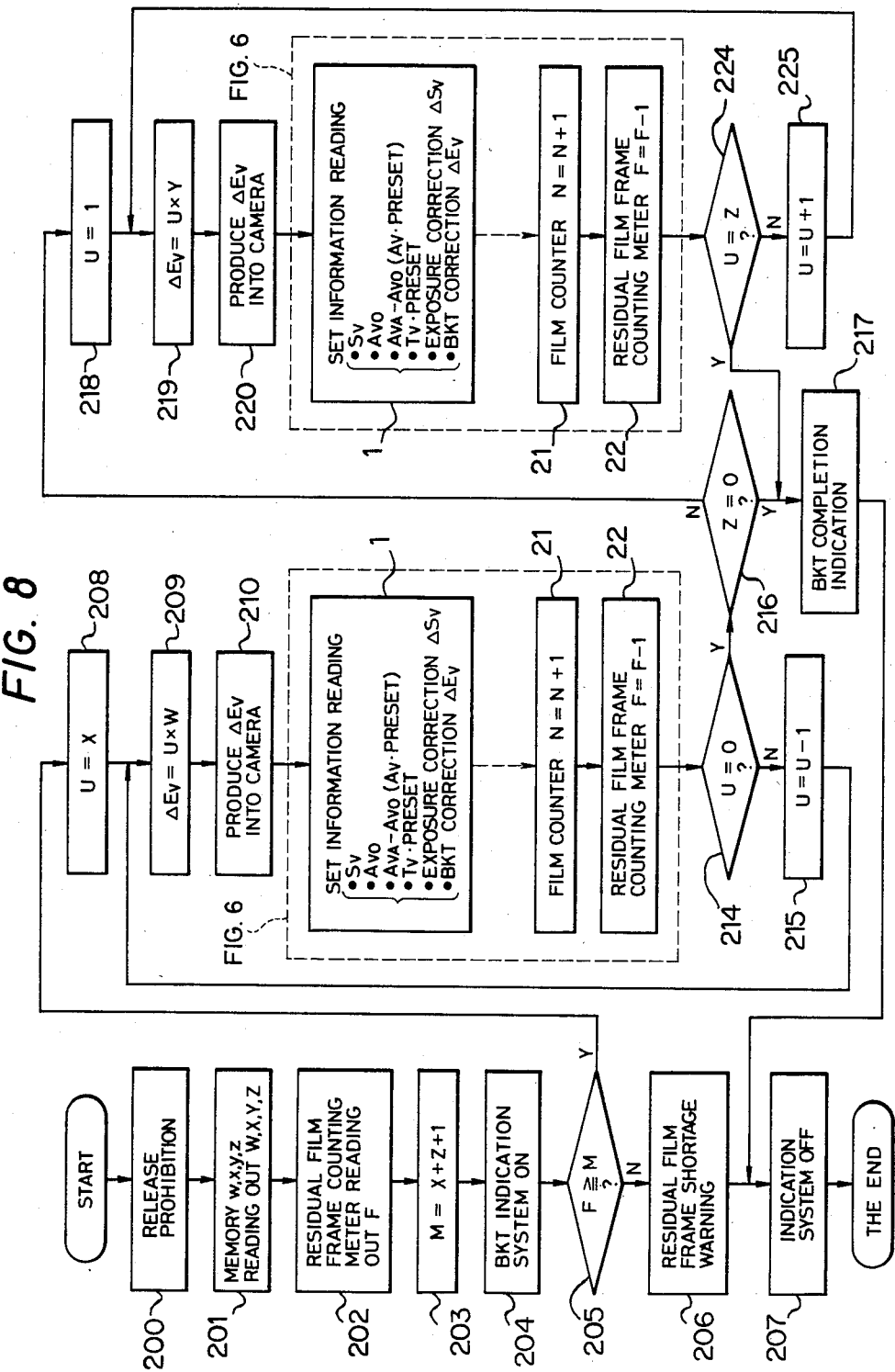

BRACKETING EXPOSURE CONTROL CAMERA

BACKGROUND OF THE INVENTION

1. Field of the Invention

The present invention relates to a photographic camera which is capable of bracketing photography, where exposure operations are repeated at a predetermined exposure value or one or more exposure values which are obtained by slightly correcting the predetermined exposure value and of taking photographs of an object to be photographed having slightly different exposure values on each frame of film.

2. Description of the Prior Art

A conventional photographic apparatus capable of bracketing photography is known in U.S. Pat. No. 3,762,285.

The present applicant contemplated the possibility of driving such a conventional photographic apparatus by a motor drive device so as to shorten time required for bracketing photography of a plurality of frames. However, the conventional apparatus described above cannot signal the operator when it has completed bracketing photography of a plurality of frames. Therefore, if the operator continues to depress the release button, unaware that bracketing photography has been completed, photography at a zero exposure correction amount, i.e., photography at the predetermined exposure value may be continued for some frames. In other words, the film is wasted.

SUMMARY OF THE INVENTION

It is an object of the present invention to provide a bracketing exposure control camera which is free from the above problems, which can perform bracketing photography of a plurality of frames with a motor drive device, and which will not waste film when the operator continues to depress the shutter release button after bracketing photography has been completed.

According to the present invention, the above object is achieved by comparing a preset number of frames for bracketing photography and the actual number of frames exposed so far in bracketing photography, and forcibly stopping exposure control operation upon detecting that the preset number of frames has been exposed.

BRIEF DESCRIPTION OF THE DRAWINGS

FIGS. 1 to 10 show a first embodiment of the present invention, in which:

FIG. 1 composed of FIGS. 1A and 1B is a block diagram of a bracketing exposure control camera, FIG. 2 is a diagram showing the display state of a bracketing indication part, FIG. 3 is a block diagram of a motor drive device, FIG. 4 is a block diagram of a release control signal making part, FIGS. 5A–5G are wave-forms of the part shown in FIG. 4, FIG. 6 composed of FIGS. 6A, 6B and 6C is a flow chart of the exposure control operation, FIG. 7 is a flow chart of the preset operation of bracketing information, FIG. 8 is a flow chart of the control operation for bracketing photography, FIG. 10 is a graph for explaining bracketing photography in the M mode.

DESCRIPTION OF THE PREFERRED EMBODIMENTS

FIGS. 1 to 11 show a first embodiment of the present invention. The first embodiment is applied to a multi-mode single lens reflex camera with an instantaneous exposure setting at stopping down.

Figure 1A:
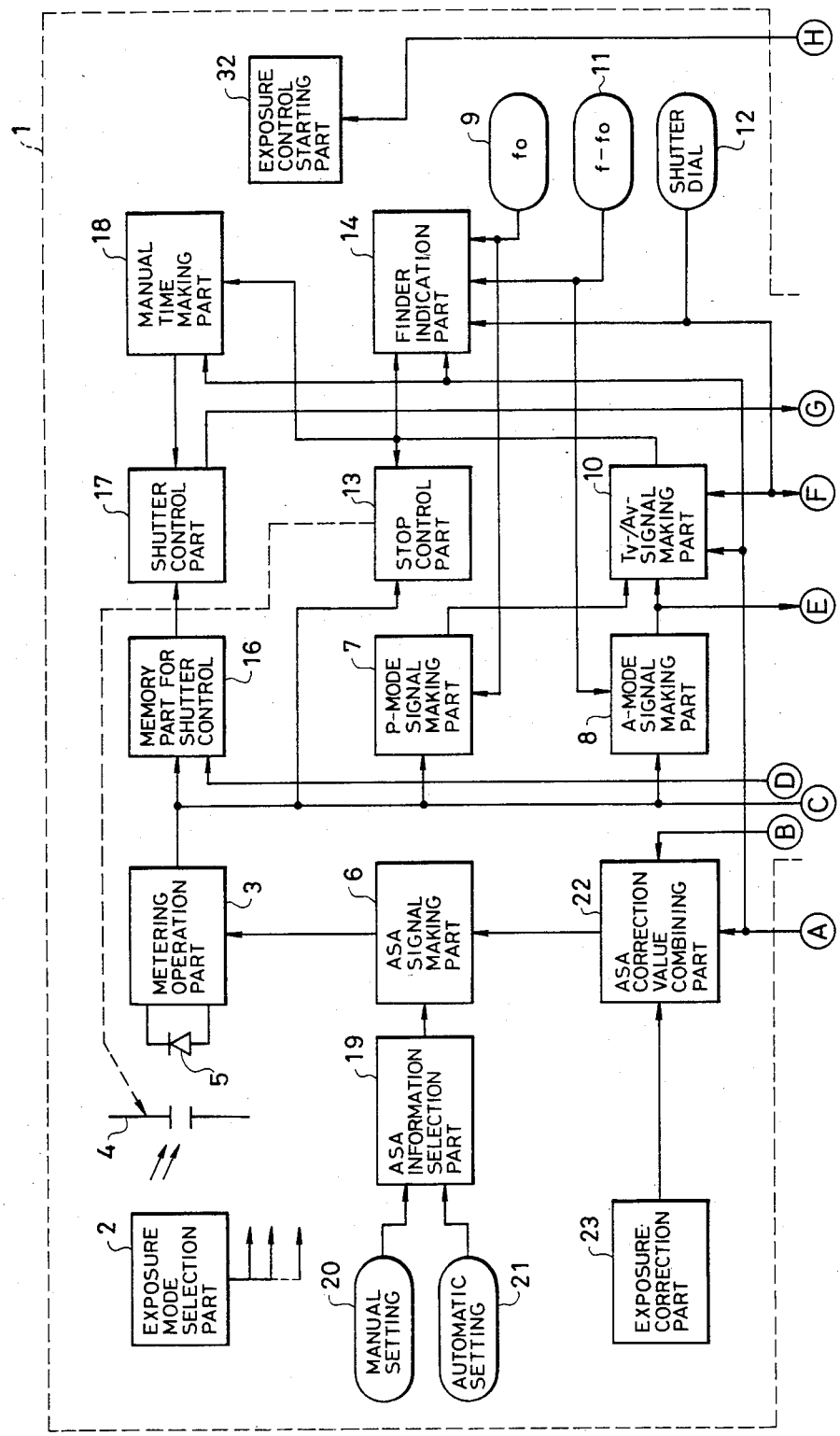
Figure 1B:
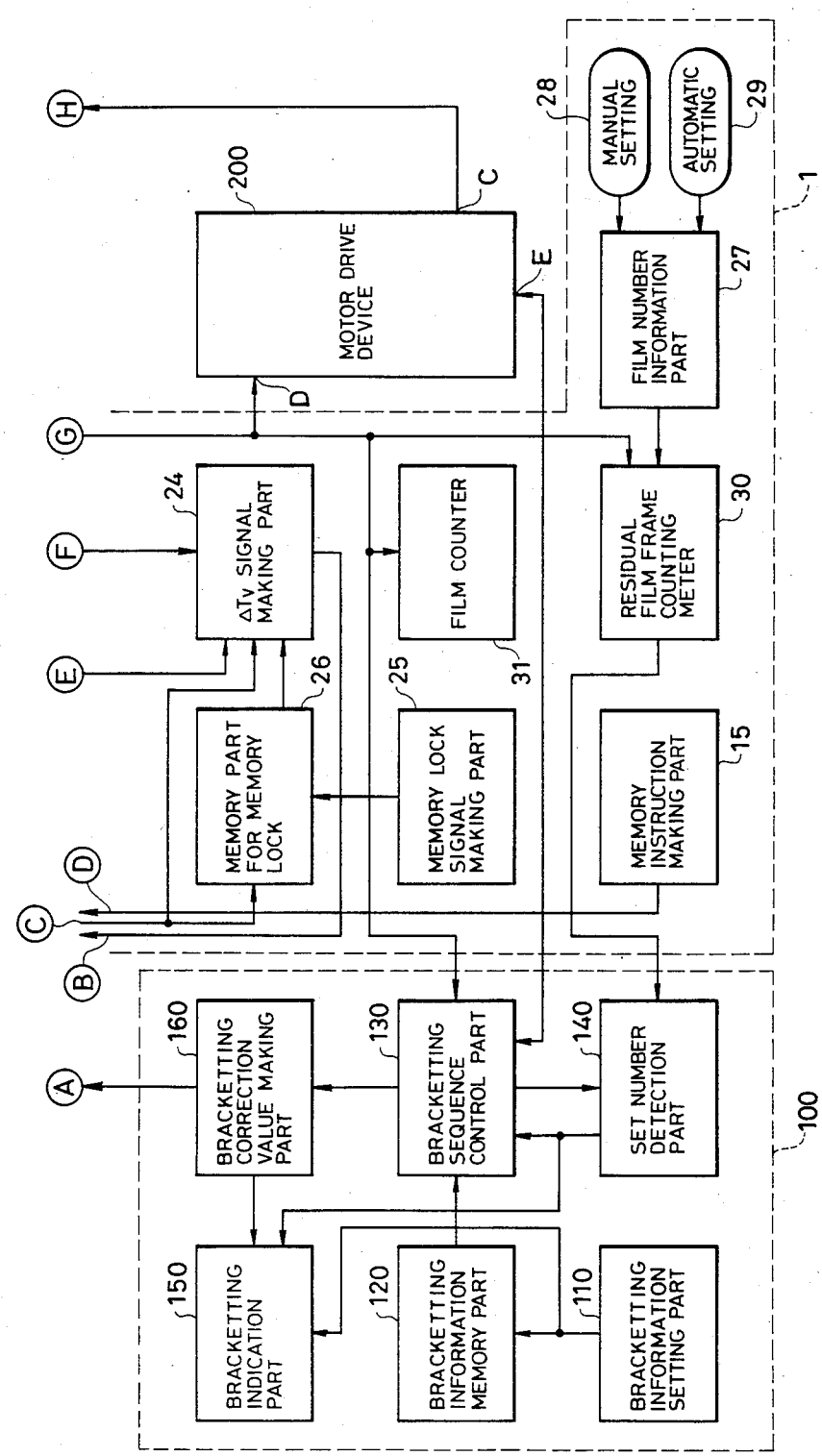

The multi-mode single lens reflex camera with the instantaneous exposure setting at stopping down as shown in FIG. 1 has an exposure control device 1, a bracketing control device 100, and a motor drive device 200.

By an exposure mode selection part 2, the multi-mode camera can select one of the diaphragm priority/shutter control AE mode (A mode), shutter priority/diaphragm control AE mode (S mode), program control AE mode (P mode), and the manual exposure control mode (M mode).

Referring to FIG. 1, a metering operation part 3 of the exposure control device 1 calculates an optimal shutter time Tv* for a combination of the selected F number and film sensitivity in accordance with the light intensity data Bv-Av* and ASA data Sv from an ASA signal making part 6. The data Bv-Av* represents the intensity of light which is reflected from an object to be photographed and becomes incident on a light-receiving element 5 through a photographic lens (not shown) and a stop 4. When the shutter time Tv* is expressed by a known Apex equation, we have:

$$Tv^* = Bv + Sv - Av^* \quad \ldots \quad (1)$$

where Av* indicates both the stop state of the stop and the F number corresponding to this state of the stop. Therefore, when the stop is fully open, Av* = Av0 and Tv* = Tv0.

The shutter time signal Tv0 in the full-aperture state is supplied to a P mode signal making part 7 and an A mode signal making par 8.

The P mode signal making part 7 receives the full-aperture F number Av0 from an f0 signal part 9, calculates an Ev value based on Av0 and Tv0, and multiplies the Ev value with a coefficient to obtain a shutter signal for obtaining an optimal exposure in the P mode, i.e., to obtain a P mode signal Tvp:

$$Tvp = \alpha Ev + \beta \quad (2)$$
$$= \alpha\{(Bv + Sv - Av0) + Av0\} + \beta$$
$$= \alpha(Tv0 + Av0) + \beta$$

The P mode signal Tvp indicates the program shutter time which is uniquely determined in accordance with the Ev value. The signal Tvp is supplied to a Tv/Av signal making part 10.

The A mode signal making part 8 receives the stopping down step number from the full-aperture F number (AvA−Av0) from an f−f0 signal part 11 and calculates (AvA−Av0) and Tv0 so as to obtain a shutter signal for obtaining an optimal exposure in the A mode, i.e., to obtain an A mode signal TvA:

$$TvA = (Bv + Sv - Av0) - (AvA - Av0) \quad (3)$$
$$= Tv0 - (AvA - Av0)$$
$$= Bv + Sv - AvA$$

The signal TvA represents an optimal shutter time which corresponds to the preset F number AvA in the A mode. The signal TvA is also supplied to the Tv/Av signal making part 10.

The Tv/Av signal making part 10 further receives a shutter time signal Tvs or TvM preset for the S or M mode from a shutter dial 12.

Based on a signal received from the exposure mode selection part 2, the Tv/Av signal making part 10 selects one of the input signals and supplies the selected signal as a shutter time signal Tv to a stop control part 13 and a finder indication part 14. Therefore, the Tv/Av signal making part 10 generates signals TvA, Tvp and Tvs as the shutter time signal Tv in the A, P and S AE modes, and generates a signal TvM in the M mode. In the S mode, the part 10 generates an F number signal Avs for obtaining an optimal exposure for the signal Tvs. When the aperture control is started, the part 10 holds its output.

The stop control part 13 receives the signal Tv from the part 10 and the signal Tv* from the part 3 during aperture control. The part 3 compares the two input signals and stops the stop 4 when Tv*=Tv.

A memory instruction making part 15 supplies a signal indicating an end of control of the stop 4 or a signal synchronized with the mirror up operation as a memory instruction to a shutter control memory part 16. The part 16 receives the memory instruction and stores the shutter time signal Tv* sent from the part 3 at this time. The shutter control part 17 performs shutter control or exposure time control in accordance with the signal Tv* stored in the memory part 16.

The finder indication part 14 receives a shutter time signal Tv from the part 10, the full-aperture F number signal Av0 from the part 9, and the signal AvA−Av0 from the part 11, and displays the shutter time signal Tv, the aperture signal Av and the like in the mode selected by the part 2.

A manual time making part 18 receives a signal TvM from the part 10, prepares a manual shutter time signal TvM designated by the shutter dial and sends it to the shutter control part 17. In response to the signal TvM, the part 17 performs shutter control in the M mode.

An ASA information selection part 19 receives signals from an ASA manual setting part 20 and an ASA automatic setting part 21. The part 21 automatically reads ASA information on a film or a film cartridge. The part 19 automatically or manually selects one of the two signals and sends the selected signal as ASA information to the ASA signal making part 6. The part 6 also receives an ASA correction amount from an ASA correction value combining part 22. The part 6 sends a signal combined with the ASA information to the part 3 as an ASA signal Sv. In addition to the correction information ΔSv from the part 23, the part 22 receives a ΔTv signal from a ATv signal making part 24 or a bracket signal or a ΔEv signal from the bracketing control device 100. The part 22 combines the signals ΔSv, ΔTv and ΔEv and sends the combined signal as an ASA correction value ΔSv to the part 6.

When the operator depresses the memory lock button (not shown) of the camera to perform a memory lock operation, a memory lock signal making part 25 supplies a memory lock signal to the memory part 26. In response to this, the part 26 stores the shutter signal Tv0 in the full-aperture state.

When the object brightness in the full-aperture state is assumed to be an Apex value Bv0, the shutter signal Tv0 in the full-aperture state is given by:

$$Tv0 = Bv0 + Sv - Av0 \ldots \quad (4)$$

At this time, the shutter time signal TvA in the A mode, i.e., the output from the A mode signal making part 8, the shutter time signal Tvp in the P mode, i.e., the output from the P mode signal making part 7, and the F number signal Avs in the S mode, i.e., the F number controlled by the stop control part 13 are given by:

$$TvA = Bv0 + Sv - AvA \ldots \quad (5)$$

$$Avs = Bv0 + Sv - Tvs \ldots \quad (6)$$

$$Tvp = \alpha Ev + \beta = \alpha(Bv0 + Sv) + \beta \ldots \quad (7)$$

Note that the F number or stop value preset by the part 9 before a shutter release operation in the A mode is represented by AvA, the shutter time preset by the shutter dial before the shutter release operation in the S mode is represented by Tvs, and the signal ASA is represented by Sv. Also note that α and β are constants.

In the above apparatus, when one of the A, S and P mode is selected and a memory lock operation is performed, exposure control must be performed in accordance with the values given by equations (5), (6) and (7) for changes in object brightness. When these values in the memory lock operation are respectively represented by TvA(ML), Avs(ML), and Tvp(ML), the shutter speeds and F numbers in the shutter release operation upon a memory lock operation must be the exact values given by equations (8), (9), and (10):

$$TvA(ML) = Bv0 + Sv - AvA \ldots \quad (8)$$

$$Avs(ML) = Bv0 + Sv - Tvs \ldots \quad (9)$$

$$Tvp(ML) = \alpha(Bv0 + Sv) + \beta \ldots \quad (10)$$

When the Tv value in the full-aperture state stored in the part 26 in the memory lock operation is represented by Tv0(ML), it is given from equation (4) as:

$$Tv0(ML) = Bv0 + Sv - Av0 \ldots \quad (11)$$

When the object brightness changes from Bv0 ΔBv upon the memory lock operation, the output Tv0 from the part 3 changes as follows:

$$Tv0 = Bv + Sv - Av0 = (Bv0 + \Delta Bv) + Sv - Av0 \ldots \quad (12)$$

The ΔTv signal making part 24 receives a signal given by equation (11) from the part 26 and a signal given by equation (12) from the part 3, and supplies a signal ΔTv representing the difference between the two input signals to the parts 14 and 22. The signal ΔTv is given by:

$$\Delta Tv = Tv0(ML) - Tv0 \quad (13)$$
$$= (Bv0 + Sv - Av0) - [(Bv0 + Bv) + Sv - Av0] = -\Delta Bv$$

Note that the ASA correction value combining part 22 does not accept the signal ΔTv until the shutter is released, i.e., during the metering operation. The shutter times and F numbers TvA, Avs and Tvp in the respective modes can be given from equations (5), (6) and (7) by:

$$TvA = (Bv0 + \Delta Bv) + Sv - AvA \ldots \quad (14)$$

$$Avs = (Bv0 + \Delta Bv) + Sv - Tvs \ldots \quad (15)$$

$$Tvp = \alpha\{(Bv0 + ABv) + Sv\} + \beta \ldots \quad (16)$$

In order to perform photography by memory lock, the stop and shutter must both be controlled to satisfy equations (8), (9) and (10). Therefore, the part 14 receives the signal ΔTv from the part 24, corrects equations (14), (15) and (16) and displays them. Thus, we have:

Equation (14): (17)

$$TvA + \Delta Tv = TvA - \Delta Bv = Bv0 + Sv - AvA$$
$$\equiv TvA(ML)$$

Equation (15): (18)

$$Avs + \Delta Tv = Avs - \Delta Bv = Bv0 + Sv - Tvs$$
$$\equiv Avs(ML)$$

Equation (16): (19)

$$Tvp + \Delta Tv = Tvp - \Delta Bv = \alpha(Bv0 + Sv) + \beta$$
$$\equiv Tvp(ML)$$

In this manner, the finder indication part 14 correctly indicates the values TvA(ML), Avs(ML) and Tvp(ML) obtained by equations (17), (18) and (19).

When the shutter release operation is performed, that is, when the shutter release button is depressed, the ASA correction value combining part 22 receives the signal ΔTv (= −ΔBv) from the ΔTv signal making part 24. The signal ΔTv is supplied to the ASA signal making part 6. The part 6 combines the signal ΔTv with the ASA data Sv and changes the ASA signal supplied to the part 3 from Sv to (Sv−ΔBv). The value Tv0 of equation (12) changes as:

$$Tv0 = (Bv0 + \Delta Bv) + (Sv - \Delta Bv) - Av0 \quad (20)$$
$$= Bv0 + Sv - Av0$$

As a result, equations (14) and (16) change, and the shutter signal Tv supplied from the part 10 to the part 13 changes in the A and P modes as follows:

$$TvA = (Bv0 + \Delta Bv) + (Sv - \Delta Bv) - AvA \quad (21)$$

$$= Bv0 + Sv - AvA \equiv TVA(ML)$$

$$Tvp = \alpha\{(Bv0 + \Delta Bv) + (Sv - \Delta Bv)\} + \beta \quad (22)$$
$$= \alpha(Bv0 + Sv) + \beta \equiv Tvp(ML)$$

In the S mode, the signal Tvs is supplied as the shutter signal Tv to the stop control part 13. Therefore, even if the output from the part 3 changes, the output signal Tvs from the part 10 does not change.

The above signal change is performed in an interval from the release operation to the stop lock by a stop lock member (a member for locking the stop in the open state). When the lock operation of the stop by the stop lock member is released, aperture control or stopping down is started and the signals Tva, Tvp and Tvs from the part 10 are held. The output signal from the operation part 3 given by equation (20) becomes from equation (1) as follows:

$$Tv^* = Bv0 + Sv - Av^* \ldots \quad (23)$$

When the signal Tv* coincides with TvA(ML) or Tvp(ML) given by equation (21) or (22) or with Tvs in the S mode, the stop control part 13 is operated and locks the stop 4.

Thereafter, at the storage timing of the mirror-up time or the like, the shutter control memory part 16 stores the signal Tv* (i.e., TvA(ML), Tvp(ML) or Tvs) after stop locking is stored, and shutter control is performed by the shutter control part 17 in accordance with the stored value. The aperture in the S mode is given from equation (23) as:

$$Tvs \equiv Tv^* = (Bv0 + \Delta Bv) + (Sv - \Delta Bv) - Av^* \quad (24)$$
$$= Bv0 + Sv - Av^*$$

Therefore, if the Av value Av* after the stop lock operation is represented by Avs, the value Avs is given from equation (24) by:
$$Avs = Bv0 + Sv - Tvs = Avs(ML) \ldots \quad (25)$$

Therefore, the shutter or stop is controlled by the values TvA(ML), Avs(ML) and Tvs(ML) obtained by the memory lock operation in the A, S and P modes.

In the above embodiment, when memory lock photography is performed, in an interval from the release operation to the aperture control operation, the ASA signal making part 6 combines the signal ΔTv and the ASA signal SV. Therefore, due to change in the object brightness in an interval from the memory lock operation to the release operation, the output Tv0(ML) obtained upon the memory lock operation and that Tv0 upon the release operation are different from each other. Thus, Tv(ML) and Tv are necessarily different from each other. For this reason, before the release operation, the signal ΔTv must be supplied to the finder indication part 14, Tv(ML) or Av(ML) must be operated, and Tv(ML) or Av(ML) must be indicated. Another method which does not require such an indication will be described below.

In the above system, the ASA correction combining part 22 receives the signal ΔTv from the part 24 in synchronism with the release operation. However, in the system described below, the part 22 always receives the signal ΔTv. Therefore, the ASA signal supplied from the part 6 to the part 3 is always $(Sv + \Delta Tv)$. In the above system, the part 24 receives Tv0(ML) and Tv0, calculates the difference between the two signals, and holds the difference after the release operation. However, the system to be described below has a different function in this respect. More specifically, in this system, the $\Delta Tv$ signal making part 24 constantly supplies its output signal $\Delta Tv$ to the metering operation part 3 through the ASA correction value combining part 22 and the ASA signal making part 6. The output signal Tv0 from the metering operation part 3 including $\Delta Tv$ is constantly re-input to the part 24. Thus, a feedback circuit is formed in this system. The $\Delta Tv$ signal combining part 24 having such a feedback circuit compares the signals Tv0(ML) and Tv0, and controls its output $\Delta Tv$ such that the two signals are always the same. In other words, in the metering operation after the memory lock operation (before the release operation), the part 24 supplies a signal $\Delta Tv$ in order to constantly satisfy equation (20). In the metering operation in an interval from the memory lock operation to the shutter release operation, $Tv = Tv(ML)$ is satisfied. The finder indication part 14 need directly indicate the signal from the Tv/Av signal making part 10 and need not perform operation for performing indication correction by the signal $\Delta Tv$. After the release operation, the $\Delta Tv$ signal making part 24 stores and holds the signal $\Delta Tv$, and stop and shutter control is performed in accordance with the signal $\Delta Tv$. Equation (20) is satisfied before the release operation, and the following operation is the same as described above.

To compare the two systems, in the A mode, the stop control part 13 is operated and the stop is locked when the aperture control is started and $Tv^* = TvA(ML)$ is satisfied. However, the method of locking the stop in the A mode is slightly different in accordance with the mechanism of the photographic lens. In other words, the two memory lock methods described above can be applied to camera systems in which the stop control circuit controls the stop at a predetermined value. In contrast to this, in camera systems having lens systems in which stops are mechanically locked at the preset position of the aperture ring, electrical aperture control a described above is not required in the A mode. Therefore, if the stop control part 13 is rendered inoperative in the A mode, the stop can be locked at the value preset by the aperture ring. The F number Av is the same as that defined by $Tv^* = Tv(ML)$ from equations (20), (21) and (23) as described above. In the memory lock operation with the instantaneous light intensity feedback metering system, tne stop control portion 13 need not be operated in either of the two memory lock methods.

A description will now be made with reference to the embodiment shown in FIG. 1. Referring to Fig. 1, a film number information part 27 automatically or manually selects one of the film number signal from a film number manual setting part 28 or the film number signal from an automatic setting manual setting part 29 for automatically reading the film number data on the film patrone. The part 27 sends the selected film number signal to a residual film frame counting meter 30. A film counter 31 is also provided.

The bracketing control device 100 shown in FIG. 1 performs a series of exposure control operations by performing exposure control with reference to a predetermined exposure value in units of exposure correction amount.

The bracketing control device 100 has a bracketing information setting part 110, a bracketing information memory part 120, a bracketing sequence control part 130, a set number detection part 140, a bracketing indication part 150, and a bracketing correction value making part 160.

The bracketing information setting part 110 includes setting control members. The setting control members can be operated to separately set the unit exposure correction amount at the underexposure side with respect to the predetermined exposure value (negative step value) and the unit exposure correction amount at the overexposure side (positive step value). For example, the part 100 can set $\frac{1}{3}$ step as the negative step value and $\frac{2}{3}$ step a the positive step value.

When the setting control members are operated, the bracketing information setting part 110 can separately set the underexposure number (negative number) and the overexposure number (positive number) as the continuous (exposure) number of bracketing photography including the predetermined exposure value.

The bracketing information memory part 120 stores the negative step value set at the part 110 as a memory w, the negative number as a memory x, the positive step number as a memory y, and the positive number as a memory z.

Figure 2:
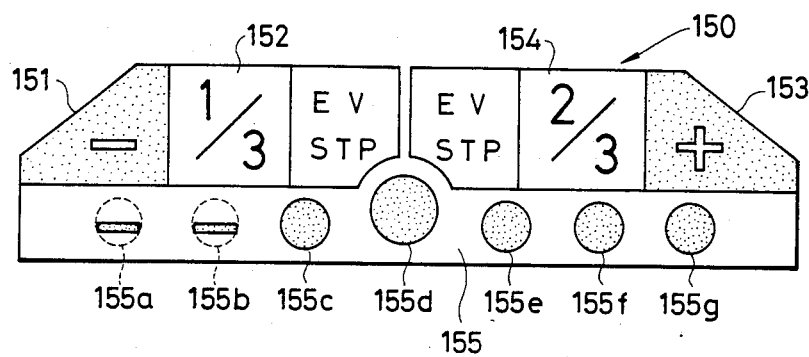

As illustrated in FIG. 2, in response to the signal from the part 110, the bracketing indication part 150 can indicate the negative step value at a negative sign indication part 151 and a negative step value indication part 152, and can indicate the positive step value at a positive sign indication part 153 and a positive step value indication part 154. The respective indication parts 152 and 153 can indicate $\frac{1}{3}$, $\frac{2}{3}$, $\frac{1}{2}$, 1 and the like. The indication part 155 can indicate the continuous photography number including the predetermined exposure. In the part 155, three small indication elements 155a to 155c are located to the left of a large indication element 155d, and three small indication elements 155e to 155g are arranged to the right of the element 155d. The respective indication elements 155a to 155g can indicate circles and bars. The circular indication of the elements 155a to 155g indicates the preset continuous photography number, and the bar indication indicates that a given frame has been exposed. The large indication element 155d represents the frame of the predetermined exposure value and is clearly distinguished from other frames. The frame indication par 155 shown in FIG. 2 indicates the negative number "3" and the positive number "3". The bar indication represents that two frames have been exposed from the negative, largest correction amount, and the circular indication represents that the remaining 5 frames have not been exposed. Of the unexposed frames, as for the frame to be exposed next, i.e., as for the frame in the standby mode, the indication element flashes to indicate this, thereby clearly indicating the current state of bracketing photography. The indication as shown in FIG. 2 is given within the finder or outside the camera.

The bracketing sequence control section 130 reads out the memories w, x, y and z of the part 120 as W, X, Y and Z, and sets a continuous photography number M obtained by adding 1 to the sum of the negative number X and the positive number Z in the set number detection part 140.

The set number detection part 140 compares the continuous photography number M from the sequence control part 130 with the residual frame number signal F from the residual frame counting mete 30. The residual frame number is the number of frames of the loaded film which ar unexposed. When the part 140 determines that F≧M, it supplies a bracketing enable signal to the sequence control part 130. However, when the part 140 determines that F<M, it inhibits the output of the enable signal to the part 130 and supplies a warning signal signalling film shortage to the bracketing indication part 150. The indication at the part 150 is all flashed to provide a warning, and then, the indication of the part 150 is extinguished.

The sequence control part 130 sends a motor drive control signal to the motor drive device 200. The motor drive control signal is set at H level until bracketing photography of a set number M is completed and is set at L level thereafter. In response to an exposure end signal from the shutter control part 17, based on the values W, X, Y and Z from the part 120, the sequence control part 130 causes the bracketing correction value making part 160 to send a bracketing signal ΔEv corresponding to the particular photographic conditions to the ASA correction value combining part 22. Assume a case wherein the continuous photography number M is set to "7", the negative step number is set to ⅓ step, and the positive step number is set to ⅔ step. In this case, every time the exposure end signal is supplied to the sequence control part 130, the correction value making part 160 sequentially supplies to the ASA correction value making part 22 seven types of bracket signals, −1 step, −⅔ step, −⅓ step, 0, +⅓ step, +4/3 step and +2 step, as the bracket signals ΔEv.

The construction of the motor drive device 200 will be described with reference to FIGS. 3 to 5.

Figure 3:
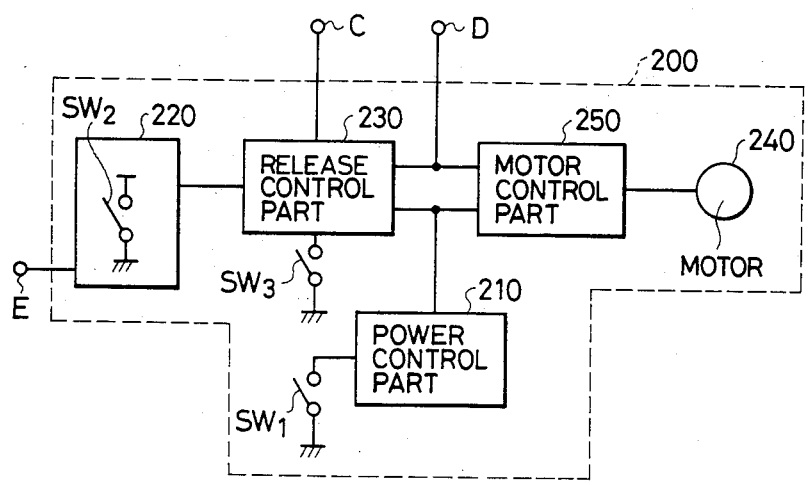

As shown in FIG. 3, the motor drive device 200 has the following parts. A semi-stroke switch SW1 is closed upon the first stroke of the release button of the camera. A power control part 210 supplies power to the circuit shown in FIG. 3 and the like when the switch SW1 is closed. A release control signal making part 220 has a release switch SW2 and a terminal E. The release switch SW2 is closed upon the shutter release operation i.e., the second stroke of the release button. The terminal E receives the motor drive control signal from the bracketing sequence control part 130. A release control part 230 supplies a release signal to a terminal C connected to the exposure control starting part 32 when a release control signal of L level is supplied from the control signal making part 220. A motor control part 250 drives a motor 240 to wind the film by one frame and supplies a winding end signal upon completion of winding operation in response to an exposure end signal (so-called winding signal) from a terminal D connected to the shutter control part 17. An SC switch SW3 switches between the 1-frame photography mode and the continuous photography mode. When the continuous photography mode is selected by turning on the SC switch SW3, if the release control signal making part 220 outputs a release control signal of L level upon pressure holding of the release button or the like, the release control part 230 supplies the release signal to the exposure control starting part 32 through the terminal C to perform continuous photography every time it receives the exposure end signal from the D terminal and the winding end signal from the motor control part 250.

Figure 4:
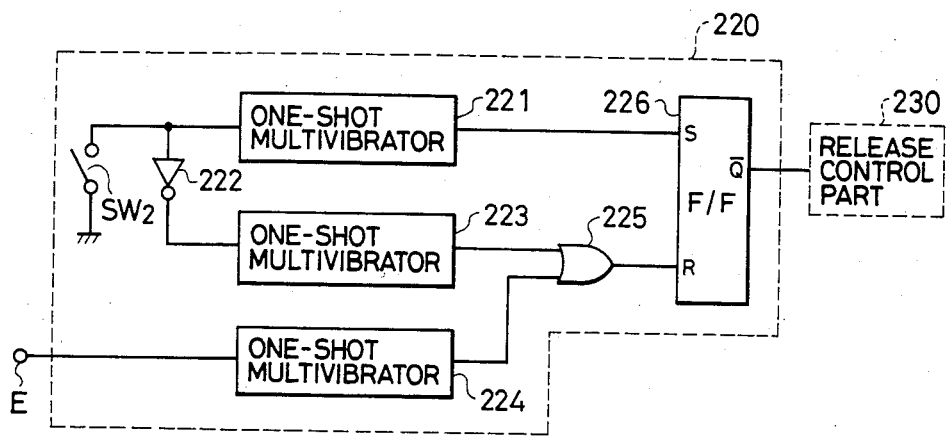

As shown in FIG. 4, the release control signal making part 220 has the following parts. A monostable multivibrator or one-shot multivibrator 221 has a negative edge trigger input terminal connected to a release switch SW2 which is closed upon the second stroke of the release button. A one-shot multivibrator 223 is connected to the release switch SW2 through an inverter 222 and has a function similar to the multivibrator 221. A one-shot multivibrator 224 is connected to the terminal E and has a similar function to the multivibrator 221. The input terminals of an OR gate 225 are connected to the one-shot multivibrators 223 and 224. A flip-flop 226 has a set input terminal connected to the multivibrator 221, a reset input terminal connected to the OR gate 225, and an output terminal $\overline{Q}$ for supplying a release control signal to the release control part 230.

Figure 6B:
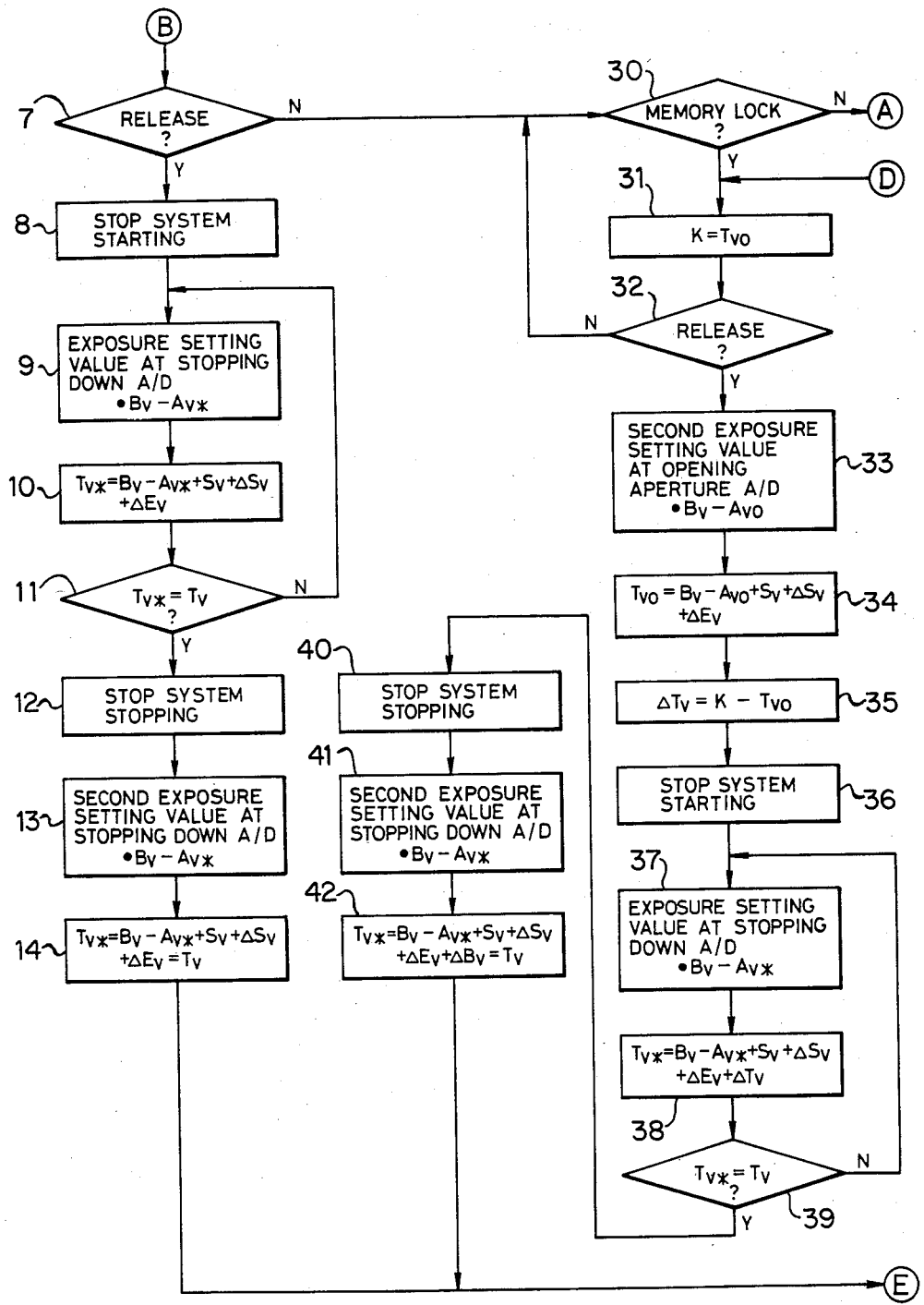
Figure 6C:
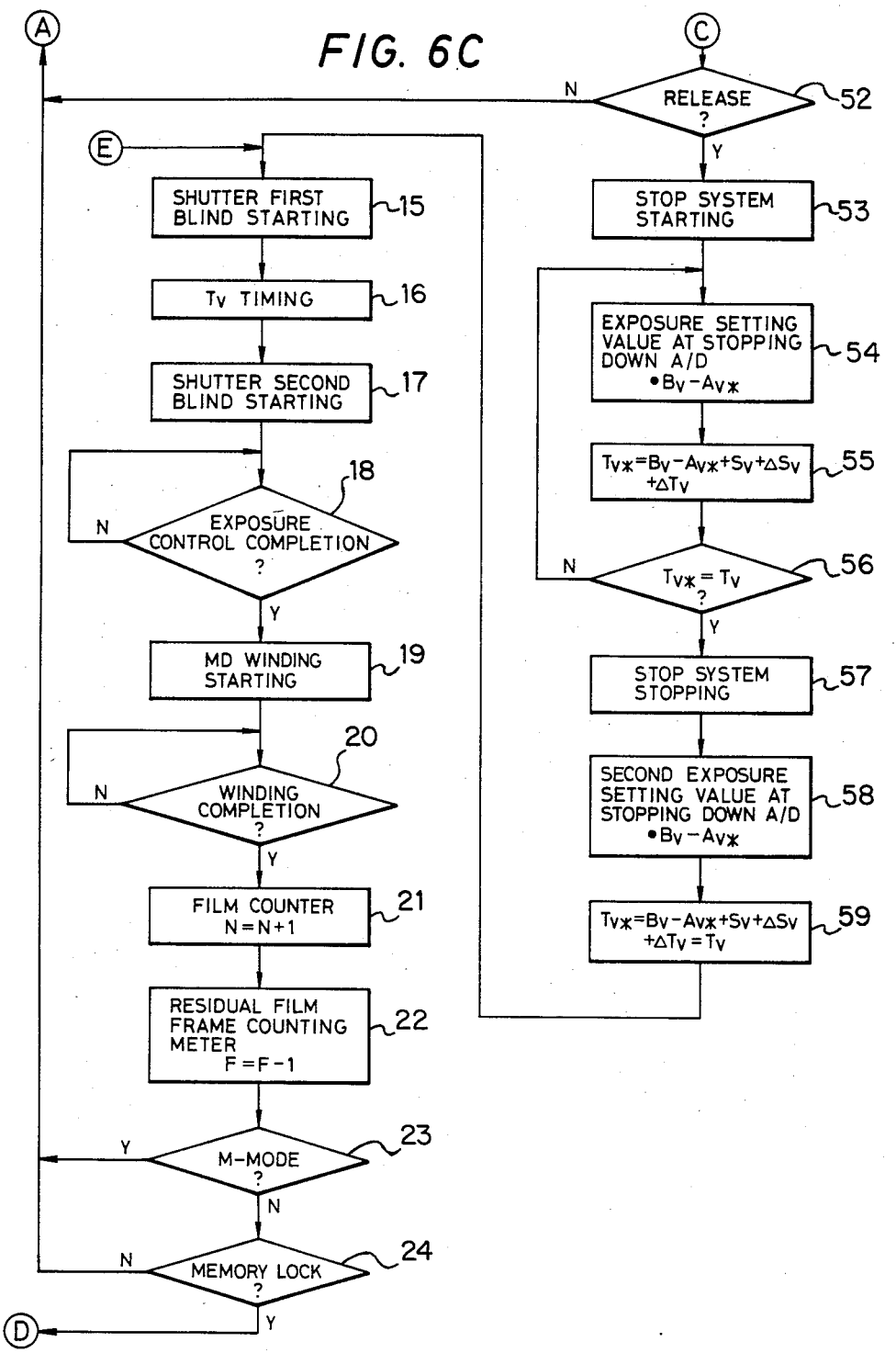
Figure 7:
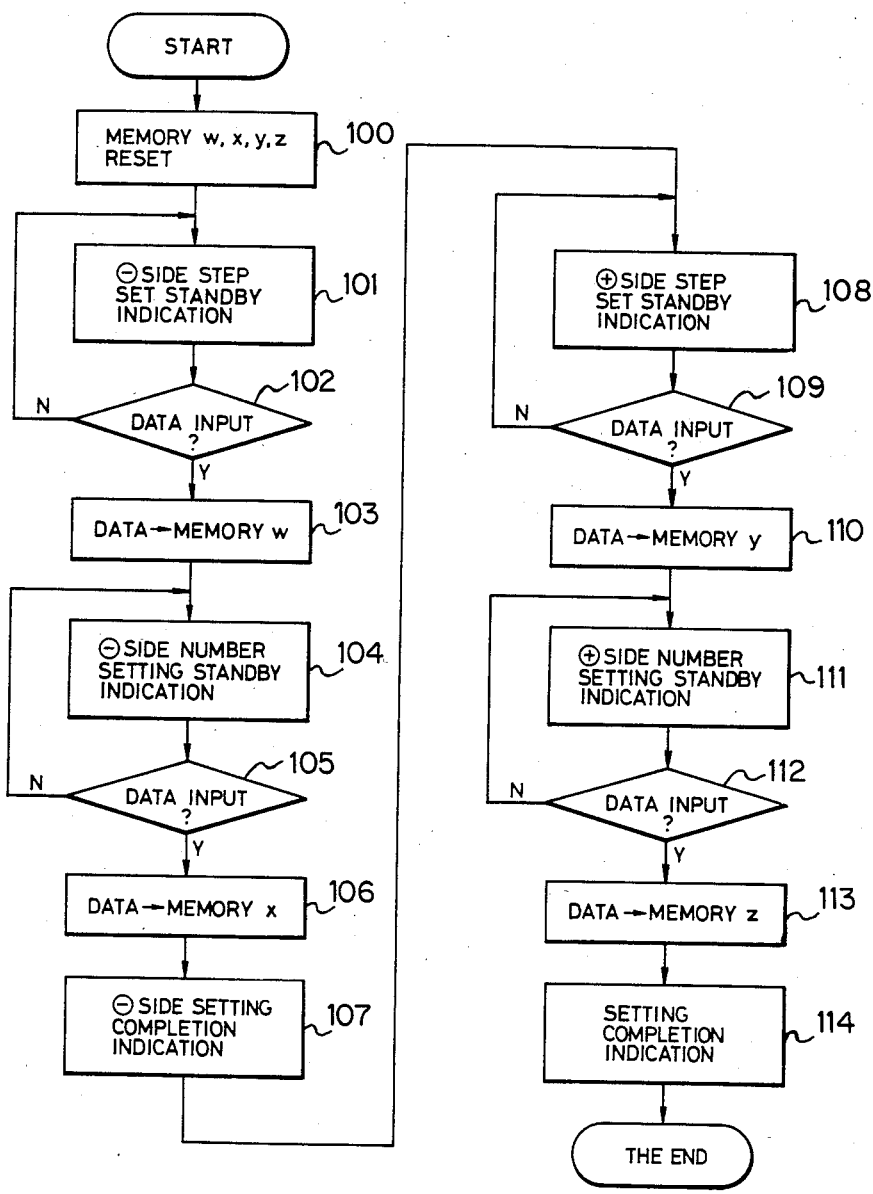

The operation of each part of the exposure control apparatus of the camera having the above configuration will be described in more detail with reference to FIGS. 6 to 10. The respective sequence steps in FIGS. 6 to 8 are controlled by a central processing unit (not shown) of the camera. This central processing unit is referred to as CPU. (1) Normal exposure control in each mode will be described with reference to FIG. 6.

(1-1) Normal Photography in A Mode

Assume that the release button of the camera depressed to close the switch SW1, and the exposure apparatus 1 is powered. In step (1), the ASA information SV is supplied from the ASA information selection part 19 to the ASA signal making part 6, the full-aperture F number Av0 is supplied from the f0 signal making part 9 to the finder indication element 14 and the P mode signal making part 7, the step number (AVA−Av0) from the full-aperture F number is supplied from the f−f0 signal part 11 to the finder indication part 14 and the A mode signal making part 8, the exposure correction value ΔSv is read out from the exposure correction part 23, and, in the bracketing photography mode, the bracketing correction value ΔEv is supplied from a bracketing correction value making part 160 to the ASA correction value combining part 22. Note that the bracketing correction value ΔEv is 0 in the normal photography mode. In step (2), the metering operation part 3 converts the full-aperture light intensity (Bv−Av0) into a digital signal. In step (3), the metering operation part 3 adds the digital signal to the ASA signal (Sv+ΔSv+ΔEv) to provide the optimal full-aperture shutter time Tv0. In step (4), the CPU checks from the output from the exposure mode selection part 2 which exposure control mode is selected. When the exposure mode selection part 2 determines that the A mode is selected, the flow advances to step (5). In step (5), in response to the optimal full-aperture shutter time Tv0 from the part 3, the A mode signal making part 8 performs the calculation:

$$Tv = TvA = Tv0 + Av0 - AvA$$
$$= (Bv - Av0) + Av0 - AvA + Sv + \Delta Sv + \Delta Ev$$

and supplies the A mode signal TvA to the Tv/Av signal making part 10. In step (6), the finder indication part 14 receives the signal from the Tv/Av signal making part 10 and indicates a shutter time corresponding to TvA. At the same time, the indication part 14 indicates an F number corresponding to AvA (=Av. preset) in response to the signals from the f0 and f−f0 signal parts.

When the shutter release button is depressed (switch SW2) is closed), or more specifically, when the release button is depressed while the release control part 230 receives the exposure end signal and the winding end signal, the motor drive device 200 supplies a release signal to the exposure control starting part 32. When the exposure control starting part 32 detects the release signal in step (7), it starts exposure control in step (8). At the same time, the Tv/Av signal making part 10 holds the output supplied to the stop control part 13. The metering operation part 3 sequentially meters the light intensity (Bv−Av*) which is changing and converts it into a digital signal. The part 3 thus calculates the optimal shutter time Tv* (Tv*=Bv−Av*+Sv+$\Delta$Sv $\Delta$Ev) in accordance with the obtained digital signal.

In step (11), the stop control part 13 compares the output Tv* from the metering operation part 3 which changes in accordance with the exposure control operation and the output Tv (=TvA) held by the Tv/Av signal making part 10. When the two outputs coincide with each other, the stop control part 13 locks the stopping down operation of the stop 4 in step (12). In step (13), the operation part 3 meters the transmission light through the stop 4 again after the stopping down operation and calculates Tv* (=Tv) in step (14) again.

In response to the signal from the memory instruction making part 15, the shutter control memory part 16 stores the shutter time signal Tv*. In accordance with the stored value, the shutter control part 17 performs shutter control.

The shutter control part 17 starts the shutter front curtain in step (15) and counts the shutter time (exposure time) Tv in Step (16). When it is determined that the stored shutter time Tv* coincides with the actual exposure time, the part 17 starts the rear curtain in step (17) and completes exposure control. In this manner, an optimal exposure in the A mode is obtained. The shutter control part 17 detects in step (18) that exposure control is completed. When the exposure end signal is supplied from the shutter control part 17 to the motor drive device 200 in step (19), the motor drive device 200 starts the winding operation. Upon this winding operation, film winding and shutter charge and the like are performed. When the motor drive device 200 detects in step (20) that the winding operation is completed, the count of the counter 31 is incremented by one in step (21) and the count of the meter 30 is decremented in step (22). The CPU checks in step (23) if the manual mode is selected. After it is checked in step (24) if a memory lock operation is performed, the flow returns to the start.

(1-2) Normal Photography in P Mode

When the P mode is selected by the exposure mode selection part 2, the control sequence of the CPU advances to step (5a) from step (2) through steps (3), (4) and (4a). In step (5a), the P mode signal making part 7 calculates:

Tv (=Tvp)=$\alpha$(Bv+Sv+$\Delta$Sv+$\Delta$Ev)+$\beta$

Based on the P mode signal Tvp, the Tv/Av signal making par 10 calculates:

Av=(1−$\alpha$)Ev−$\beta$

In step (6), the values Tv (=Tvp) and Av in the P mode are supplied to the finder indication part 14.

Thereafter, the flow advances to step (7) as in the case of the A mode. In this case, the Av value supplied from the Tv/Av signal making part 10 is supplied to only the finder indication part 14, and only the signal Tvp is supplied to the stop control part 13. The remaining details of the operation are the same as in the A mode, and will not be described. In this manner an optimal exposure is obtained in the P mode.

(1-3) Normal Photography in S mode

When the S mode is selected, the flow sequence of the CPU advances from step (2) to step (5b) through steps (3), (4), (4a) and (4b).

In step (5b), the S mode signal Tvs (=Tv. preset) is supplied from the shutter dial 12 to the Tv/Av signal making part 10. The part 10 performs the calculation: Av =Bv+Sv+$\Delta$Sv+$\Delta$Ev−Tvs The Tv/Av signal making part 10 supplies the values Tv (=Tvs) and Av to the finder indication part 14. The remaining operation is the same as in the A and P mode, and the sequence advances to step (7). In this case, the values Av and Tv supplied from the Tv/Av signal making part 10 are supplied to the indication part 14. Only the value Tv (Tvs) is supplied to the stop control part 13. The remaining operation is the same as in the A mode, and will not be described. In this manner, an optimal exposure is obtained in the S mode.

(1-4) Normal Photography in M mode

When the M mode is selected, the flow of the CPU advances to step (5c) through steps (2), (3), (4), (4a) and 4(b). The Tv/Av signal making part 10 performs the following calculation in step (5c):

Tv=TvM+$\gamma\Delta$Ev

Av=AvM+(1-Y)$\Delta$Ev

TvA=Bv+Sv+$\Delta$Sv−AvM

The values Tv and Av and the shutter time TvA for obtaining an optimal exposure for the value Av are supplied to the finder indication part 14. The part 14 indicates these values in step (50). As has been described above, since the bracketing correction value $\Delta$Ev =0, the values Tv and Av are values TvM and AvM which are preset by the shutter dial 12 and the f-f0 part 11.

Upon a memory lock operation, the $\Delta$Tv signal making part 24 makes the signal $\Delta$Tv in accordance with the signals from the metering operation part 3 and the memory part 26. In the M mode, in step (51), based on the signal TvA from the A mode signal making part 8 and the signal TvM from the shutter dial 12, the $\Delta$Tv signal making part 24 calculates the signal $\Delta$Tv:

$$\Delta Tv = TvM - TvA \qquad (26)$$

$$= TvM - (Bv + Sv + \Delta Sv - AvM)$$

The signal $\Delta$Tv is supplied as the Sv value correction value upon the release operation to the ASA signal making part 6 through the AS correction value combining part 22.

In the metering operation before release operation, the ASA signal making part 6 supplies (Sv +$\Delta$Sv) as ASA information to the metering operation part 3. When the shutter release button is released to the second stroke and the CPU determines it, the ASA signal making part 6 changes its output from (Sv +$\Delta$Sv) to (Sv 30 $\Delta$Sv+$\Delta$Tv). At the same time, the $\Delta$Tv signal making part 24 holds the output ΔTv. The exposure control part 32 starts the stop system in step (53). When exposure control is started, the Tv/Av signal making part 10 holds the output Tv.

The metering operation part 3 converts into digital signals the stopped-down light intensity (Bv−Av*) which changes during the aperture control. Based on the ASA information (Sv+ΔSv+ΔTv) after adding ΔTv to the metered value (Bv−Av*), the part 3 calculates the current optimal shutter time Tv*. From equation (26), the shutter time Tv* is given by:

$$Tv^* = Bv + (Sv + \Delta Sv + \Delta Tv) - Av^* \quad (27)$$
$$= TvM + (AvM - Av^*)$$

In step (56), the stop control part 13 compares th output Tv* from the metering operation part 3 changing in accordance with exposure control and the output Tv held by the Tv/Av signal making part 10. When the part 13 determines that the two outputs coincide with each other, it stops aperture control of the stop 4. From equation (27), the signal Tv* upon the stop lock operation is given by:

$$Tv^* = TvM + (AvM - Av^*) = Tv \ldots \quad (28)$$

In the normal photography mode, Tv =TvM, and the stop is controlled in accordance with (Av* =AvM).

In step (58), the metering operation part 3 performs another metering after the aperture control, and the shutter time Tv* (=Tv) corresponding to the second metering operation is calculated. The operation of step (15) and thereafter based on the obtained shutter time Tv* =Tv is the same as in the A, P and S modes. In this manner, exposure control in the manual mode is performed in accordance with the values Tv and Av.

(2) Memory Lock Operation

The memory lock operation will be described with reference to FIG. 6.

In step (7), the CPU shifts to step (3) if the release signal is not detected. If it is determined in step (3) that the memory lock button (not shown) has been depressed, the CPU advances to step (31). In step (31), the memory lock signal from the memory lock signal making part 25 is supplied to the memory part 26. The memory part 26 stores the full-aperture optimal shutter. time Tv0 from the operation part 3 as K. At the same time, the finder indication part 14 holds its present indication.

When the CPU detects the release signal in step (32), the CPU advances to step (33). In step (33), the metering operation part 3 converts the full-aperture light intensity (Bv−Av0) upon the release operation into a digital signal and calculates the signal Tv0 in step (34). The signal Tv0 before the release operation is supplied from the metering operation part 3 to the ΔTv signal making part 24. In step (35), the ΔTv signal making part 24 detects the difference as the signal ΔTv between the full-aperture optimal shutter time Tv0 (=K) stored in the part 26 before the memory lock operation or the shutter time which provides an optimal exposure in the full-aperture state, and the full-aperture optimal shutter time Tv0 upon the release operation. The signal ΔTv is supplied to the ASA correction value combining part 22 and is held. The metering operation part 3 generates an output Tv* including the signal ΔTv. The output Tv* is supplied to the Tv/Av signal making part 10 through the P mode signal making part 7 or the A mode signal making part 8. The Tv/Av signal making part 10 produces an operation output corresponding to the output Tv* from the metering operation part 3.

In step (36), the exposure control starting part 32 starts exposure control, and the Tv/Av signal making part 10 holds the output Tv. In steps (37) and (38), as in step (9), the metering operation part 3 calculates the stopped down light intensity (Bv−Av*) and calculates shutter time Tv* (Tv*=Bv−Av*+Sv+ΔSv+ΔTv) for obtaining an optimal shutter time corresponding to each metered value.

The stop control part 13 compares Tv* and Tv as in step (11). When it is determined that Tv* =Tv, the part 13 locks the stop in step (4). The operation part 3 performs metering as in step (13) in step (41) again. In step (42), the operation calculates Tv* again for the second metered value. Thereafter, the CPU advances to step (15).

When photography is performed after the memory lock operation, the shutter or stop is controlled in accordance with the shutter time Tv in the memory lock operation in the A, P and S AE modes.

(3) Setting of Bracketing Information

Setting operation of the bracketing information will be described with reference to FIG. 7.

When a control member for starting setting of the bracketing information among the control members on the bracketing information setting part 110 is depressed, in step (100), the bracketing information memory part 120 resets the memories w, x, y and z. In step (101), the bracketing indication part 150 peiforms standby indication of the negative step setting. For example, the negative sign indication part 151 in FIG. 5 is flashed. When a negative step number, e.g., ⅓ step is set by operating the control members of the bracketing information setting part 110, the part 100 detects the data input in step (102). In step (103), the bracketing information memory part 120 stores the negative step number as the memory w When the control sequence of the CPU advances to step (104), the negative number indication parts 155a to 155c of the number indication part 155 are flashed to indicate the standby state for setting a negative number. When control members of the bracketing information setting part 110 are controlled to set a negative number, e.g., "3", the bracketing information setting part 110 detects data input in step (105). In step (106), the part 120 stores the negative number set at the part 110 as the memory x. In step (107), the bracketing indication part 150 indicates completion of the negative number setting by keeping the indication elements ON.

In step (108), the bracketing indication part 150 performs standby indication of the positive step. The standby indication is provided by flashing, for example, the positive sign indication part 153. When the control members of the bracketing information setting part 110 are operated to set a positive step number, e.g., ⅔ step, the bracketing information setting part 110 detects the data input in step (109). In step (110), the information memory part 120 stores the positive step number set at the part 110 as the memory y.

When the flow advances to step (111), the bracketing indication part 150 flashes the positive number indication parts 155e to 155g of the number indication part 155 so as to provide a standby indication of a positive number. When the control members of the bracketing information setting part 110 are operated to set a positive number, e.g., "3", the bracketing information setting part 110 detects data input in step (111). In step (113), the bracketing information memory part 120 stores the positive number set at the part 110 as the memory z. Then, the bracketing indication part 150 indicates that all setting operations have been completed. This indication can be provided by, e.g., flashing all the parts 151 to 155 for a predetermined period of time.

In this manner, as shown in FIG. 2, the bracketing information is indicated by the bracketing indication part 150. In this embodiment, the bracketing indication part 150 flashes for a predetermined period of time and then extinguishes.

(4) Bracketing Photography

Bracketing photography performed after setting bracketing information in the above manner will be described with reference to FIG. 8.

After setting the bracketing information, when the operation start control member of the bracketing information setting part 110 is operated, the operation as shown in FIG. 8 starts. In step (200), the release control part 230 inhibits generation of a release signal. In step (201), the bracketing sequence control part 130 reads out data stored in the memory part 120, i.e., w (negative step number), x (negative number), y (positive step number) and z (positive number) as W, X, Y and Z.

In step (202), the set number detection part 140 reads out the residual film frame number F from the residual film frame counting meter 30. The sequence control part 130 calculates the continuous number M obtained by adding 1 to the sum of the negative number X and the positive number Z, and sends it to the set number detection part 140. In step (204), the indication of the bracketing indication part 150 is turned on as shown in FIG. 2.

In step (205), the set number detection part 140 compares the residual film frame number F and the continuous number M. If $F \geq M$ is not satisfied, the flow advances to step (206). However, if $F \geq M$, the flow advances to step (208).

In step (206), the set number detection part 140 outputs an inhibition signal for bracketing photography to the sequence control part 130. The part 140 also supplies a warning signal signalling film shortage to the bracketing indication part 150. The part 150 warns this in step (207) by turning off all the indication elements.

The operation of step (208) and thereafter will be described with reference to a case wherein the negative step number W is $\frac{1}{3}$, the negative number X is "3", the positive step number Y is $\frac{2}{3}$, and the positive number Z is "3".

In step (208), the sequence control part 130 sets $U + X = 3$. In step (209), the bracketing correction value making part 160 makes the exposure correction value $\Delta Ev (= -1)$ for $\Delta Ev = U (=3) \times W (=-\frac{1}{3})$. In step (210), the correction value making part 160 outputs $\Delta Ev (=-1)$ to the ASA correction value combining part 22. When the release button is depressed to the first stroke after the correction value making part 160 outputs $\Delta Ev$, the operation from step (1) to step (6) or (51) is performed. When the release button is further depressed to the second stroke, the release control part 230 releases the inhibition of generation of the release signal. Therefore, the switch SW2 is turned on, and the release control part 230 supplies the release signal to the C terminal. When the CPU detects generation of the release signal in step (7) or (52), the exposure control starting part 32 starts operation, and the operation up to step (18) in FIG. 6 is performed. In this manner, in each mode shown in FIG. 6, exposure control is performed in accordance with the optimal shutter time Tv or F number Av to which the exposure correction value $\Delta Ev (=-1)$ is added as a correction term. The exposure control end signal is supplied from the shutter control part 17 to the sequence control part 130. The release control part 230 inhibits release operation upon exposure control end in step (18).

Upon this operation, exposure of the first frame at an exposure value corrected by $\Delta Ev = -1$ is completed.

When the operation from step (19) to (22) in FIG. 6 is performed, the CPU advances to step (214) in FIG. 8. The sequence control part 130 checks if $U = 0$ in step (214). In this case, since $U = 3$, the sequence control part 130 advances to step (215). The sequence control part 130 sets $U = U (=3) - 1 = 2$ in step (215). Thereafter, the CPU returns to step (209). If the release button is kept depressed, the operation from step (1) to step (6) or (51) in FIG. 6 is performed as steps (209) and (210) end. The CPU then advances from step (6) or (51) to the next step. That is, the release control part 230 releases the inhibition of generation of the release signal, and supplies a release signal to the C terminal. Thus, the same operation as above is performed. In this manner, exposure of the second frame with the exposure correction term $\Delta Ev = -\frac{2}{3}$ is performed.

Thereafter, when $U = 1$ in step (209) through steps (214) and (215), the third frame is exposed with the exposure correction term $\Delta Ev = -\frac{1}{3}$. When $U = 0$ in step (209), photography is performed with the correction term $\Delta Ev = 0$, i.e., photography at a predetermined exposure value. The predetermined exposure value is an exposure value which provides an optimal exposure if the AE mode is selected. After exposure, in step (214), since $U = 0$, the sequence control part 130 advances to step (216). In step (216), it is checked if $Z = 0$. If $Z = 0$, the CPU advances to step (217). In step (217), the bracketing indication part 150 indicates an end of bracketing photography in step (217). The CPU then advances to step (207).

In this example, since $Z = 3$, the CPU advances from step (216) to step (218). In step (218), the sequence control part 130 sets $U = 1$. In step (219), the correction value making part 160 makes the exposure correction value $\Delta Ev (= +\frac{2}{3})$ of $\Delta Ev = U (=1 \times Y (=+\frac{2}{3})$. In step (22), the correction value making part 160 outputs $\Delta Ev (= +\frac{2}{3})$ to the ASA correction value combining part 22. In steps (1) to (22), the fifth frame (first positive side frame) is exposed with the correction term $\Delta Ev = +\frac{2}{3}$.

In step (224), the sequence control part 130 checks if $U = Z (=3)$. Since $U = 1$ in this case, the flow goes to step (225). In step (225), the part 130 sets $U = U (=1) + 1$. The CPU then returns to step (219).

When $U = 2$ in step (219), the sixth frame is exposed with the correction term $\Delta Ev = +4/3$. When $U = 3$ in step (219), the seventh (last) frame is exposed with the correction term $\Delta Ev = +2$.

After exposure of the seventh frame, since $U = Z$ in step (224), the CPU advances to step (217) and the bracketing indication part 150 indicates an end of bracketing photography.

In this manner, in the flow chart shown in FIG. 8, bracketing photography is sequentially performed from a shot having a maximum negative correction amount to a shot having a maximum positive correction amount.

The sequence of bracketing photography is not limited to that shown in FIG. 8. For example, in the manner opposite to the example shown in FIG. 8, bracketing photography ca be performed from a shot having a maximum positive correction amount to a shot having a maximum negative correction amount. Alternatively, a shot having a central correction amount value (predetermined exposure value) can be exposed at the first time, and shots having negative and positive correction amounts can be made alternately.

Bracketing photography in each mode will be described with reference to FIGS. 9A, 9B, 9C and 10.

(4-1) Bracketing Photography in A mode

Bracketing photography in the mode will be described with reference to FIG. 9A.

Figure 9A:
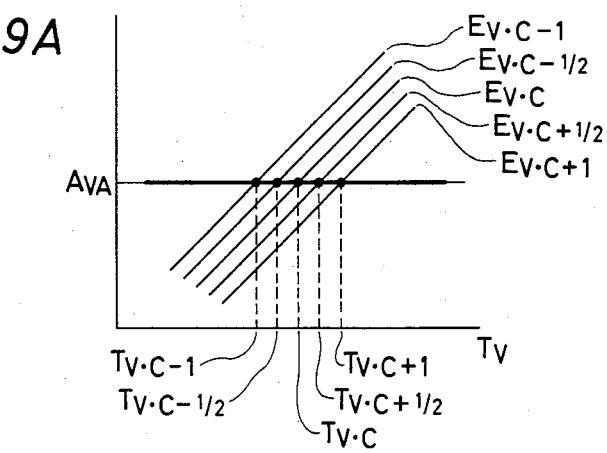
FIG. 9A is a graph for explaining bracketing photography in the A mode.

FIG. 9A shows bracketing photography in the A mode. Referring to FIG. 9A, the value Ev (predetermined exposure value for obtaining an optimal exposure) before bracketing photography is represented by Evc, and the value Ev when exposure control is performed in units of ½ steps is given by (Evc−½), Evc, (Evc+½), and (Evc+1).

As shown in FIG. 9A, when the Tv value for obtaining an optimal exposure for the preset F number AvA, i.e., a reference Tv value when the exposure correction amount ΔEv is 0 is represented by Tvc, it is given by:

$$Tvc = Bv + Sv + \Delta Sv - AvA \quad (29)$$
$$= Evc - AvA$$

When a correction term of ΔEv is added to Evc, the term (Sv+ΔSv) in equation (29) becomes (Sv+Sv+ΔEv). Therefore, the value Evc in equation (29) becomes (Evc+ΔEv). Then, the Tv value is rewritten $$Tvc = Bv + (Sv + \Delta Sv + \Delta Ev) - AvA \quad (30)$$
$$= Evc + \Delta Ev - AvA$$
$$= Tvc + \Delta Ev$$

The value Tv* when the correction amount ΔEv is added is given by:

$$Tv^* = Bv + (Sv + \Delta Sv + \Delta Ev) - Av^* \quad (31)$$
$$= Evc + \Delta Ev - Av^*$$

Since the stop is locked when equations (30) and (31) become equal to each other, the stop is given from equations (29), (30) and (31) as:

$$Av^* = Evc + \Delta Ev - Tvc \quad (32)$$
$$= Evc + \Delta Ev - (Tvc + \Delta Ev)$$
$$= Evc + \Delta Ev - (Evc - AvA + \Delta Ev)$$
$$= AvA$$

As can be seen from equation (32), the stop is controlled by the preset F number AvA, and the corresponding shutter time is controlled by (Tvc+ΔEv) as indicated by equation (30). Since the description of the flow chart shown in FIG. 6 is the same as in normal photography, it is omitted. This also applies to the P and S modes to be described below. When ΔEv changes in the order of −1, ½, 0, +½ and +1, the Tv value changes in the order of (Tvc−1), (Tvc− ½), Tvc, (Tvc+½), and (Tvc+1), and bracketing photography in the A mode shown in FIG. 9A is performed. When the lens is locked mechanically at the preset F number set by the aperture ring, equation (29) is satisfied even if separate electrical stop control is not performed. Therefore, the shutter is controlled by (Tvc+ΔEv) to provide the above-mentioned result.

(4-2) Bracketing Photography in S mode

Figure 9B:
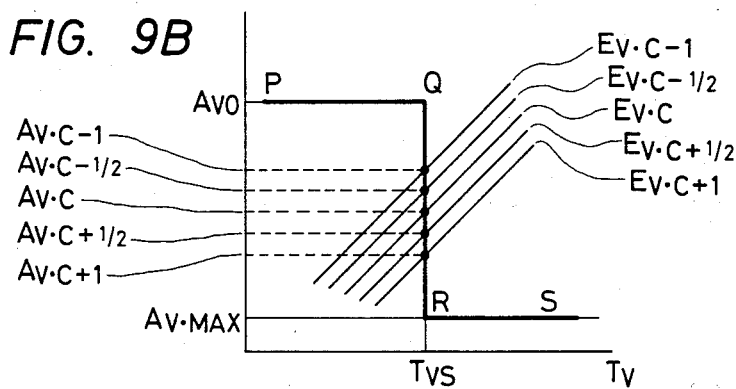
FIG. 9B is a graph for explaining bracketing photography in the S mode.

FIG. 9B shows bracketing photography in the S mode. When the Av value for obtaining an optimal exposure for a preset shutter time Tvs, i.e., a reference Tv value when the exposure correction amount ΔEv for bracketing photography is set 0 is represented by Avc, Tvs is given by:

$$Tvs = Bv + Sv + \Delta Sv - Avc \quad (33)$$
$$= Evc - Avc$$

Since the shutter signal Tv* when the exposure correction ΔEv is added in bracketing photography is given by equation (31), the stop is locked from equations (31) and (33) as follows:

$$Tv^* = Evc + \Delta Ev - Av^* \quad (34)$$
$$= Tvs$$
$$= Evc - Avc$$

Therefore, the F number Av* to be controlled is given by:

$$Av^* = Avc + \Delta Ev \ldots \quad (35)$$

As can be seen from equation (35), when the amount ΔEv is changed in the order of −1, −½, 0, +½ and +1 in bracketing photography, the F number changes in the order of (Avc−1), (Avc−½), Avc, (Avc+½) and (Avc+1). This is shown in FIG. 9B. However, as shown in FIG. 9B, when the full-aperture stop state is represented by Av0 and the maximum stop down state is represented by Avmax, if the exposure control range for bracketing photography is between Av0 and Avmax, the value Tv is kept constant at Tvs and only the value As changes. However, when the Av value is opened beyond the Av0 or stopped down exceeding the Avmax theoretically, the Av value is considered as Av0 or Avmax and the value Tv changes to the longer and shorter sides from Tvs. Therefore, a combination point of the Av and Tv values moves on three lines $\overline{PQ}$, $\overline{QR}$ and $\overline{RS}$.

The principle of the S mode will be described with reference to FIG. 1.

When the full-aperture shutter signal Tv* (=Tv0) is at the lower speed side than the shutter signal Tvs supplied to the stop control part, therefore, when an optimal exposure value (including the case after correction) for the preset shutter time Tvs is not obtained unless the stop is opened exceeding its full-aperture state, the following equation is established before the release operation:

$$Tvs > Tv^* = Tv0 \ldots \quad (36)$$

Upon the release operation, the stop control part 13 is energized and locks the stop in the full-aperture state. Thereafter, the Tv signal Tv0 is stored in the shutter control memory part 16, and the shutter control part 17 performs shutter control. If an optimal exposure is not obtained with only stop control, the shutter time changes and compensates for stop control. Thus, the combination point of the Tv and Av values moves on the line $\overline{PQ}$.

When Tv* (=Tvmin) in the maximum stop down state is larger than Tvs and further stopping down is required, we have:

$$Tvs > Tv^* = Tvmin \ldots \tag{37}$$

Therefore, even if the stop is moved to the maximum stop down position Avmax which can be mechanically locked, the stop control part 13 does not perform stop lock operation. The shutter control memory part 16 stores the value Tvmin at the F number Avmax and the shutter control part 17 performs shutter control with this value. In this manner, when an optimal exposure value is not obtained with only stop control, the shutter time changes to compensate for this. The combination point of the values Tv and Av moves on the line $\overline{RS}$.

In this manner, bracketing photography in the S mode is performed with the combination of the values Av and Tv on the lines $\overline{PQ}$, $\overline{QR}$, and $\overline{RS}$ shown in FIG. 9B.

(4-3) Bracketing Photography in P mode

Figure 9C:
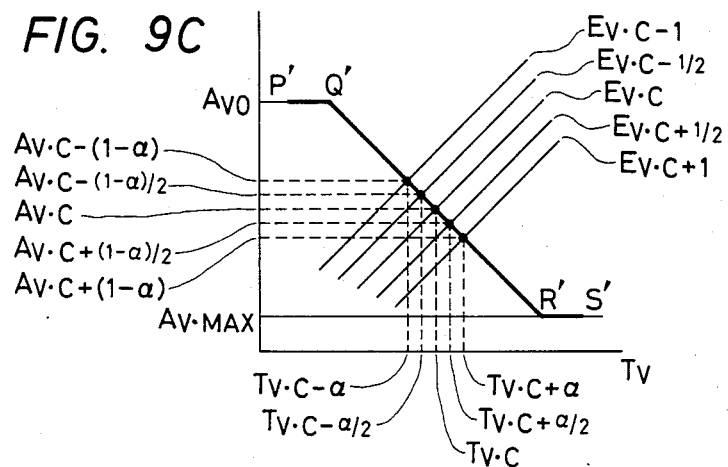
FIG. 9C is a graph for explaining bracketing photography in the P mode.

FIG. 9C shows bracketing photography in the P mode.

As described above, the P mode signal Tvp is given by:

$$Tvp = \alpha Ev + \beta$$
$$= \alpha(Bv + Sv + \Delta Sv) + \beta$$

The Ev value when the exposure correction amount ΔEv in bracketing photography is 0 is represented by Evc, and the corresponding Tvp is represented by Tvc. Assume that the value Ev is corrected by the correction amount ΔEv, and the signal Tvp changes to T'vp, T'vp is given by:

$$T'vp = \alpha(Evc + \Delta Ev) + \beta \tag{38}$$
$$= Tvc + \alpha \Delta Ev$$

When the value Av changes from Avc to (Avc+ΔAv), the sum of changes in the values Tv and Av becomes equal to the exposure correction amount ΔEv. Therefore, the change ΔAv in the Av value by exposure correction is given by:

$$\Delta Av = (1-\alpha)\Delta Ev \ldots \tag{39}$$

When the Ev value is corrected and changes from Evc to (Evc+ΔEv), the Tv and Av values change from Tvc to (Tvc+αΔEv) and from Avc to {(Avc+(1−α)ΔEv}. FIG. 9C shows the relationship between the values Tv and Av when the amount ΔEv is changed in the order of −1, −½, 0, +½ and +1. In the P mode, lines $\overline{P'Q'}$ and $\overline{R'S'}$ are present to correspond to the lines $\overline{PQ}$ and $\overline{RS}$ in FIG. 9B.

(4-4) Bracketing Photography in M Mode (4-4-1) Referring to FIG. 10, bracketing photography in the M mode will be described. In the M mode, the preset F number AvM and shutter time TvM are both corrected.

As has been described above, since the present invention is suitable to a camera system wherein the stop control circuit at the camera body side controls the stop to a predetermined value, bracketing photography in the M mode will be described with reference to such a camera system.

In bracketing photography, in order to perform exposure correction by ΔEv, the Tv/Av signal making part 10 performs exposure correction of γΔEv and (1−γ)ΔEv for the preset shutter time TvM and F number AvM. Then, a correction amount of ΔEv is obtained as a sum of the corrections of the values Tv and Av.

The ASA correction value combining part 22 receives the signal ATv given by equation (26), and the bracket signal ΔEv from the bracketing control device 100. Therefore, the ASA signal supplied from the ASA signal making part 6 to the metering operation part 3 changes from (Sv+ΔSv) to (Sv+ΔSv+ΔTv +ΔEv) upon shutter release operation. When this signal is represented by S'V, it is given from equation (26) as:

$$S'V = Sv + \Delta Sv + \Delta Tv + \Delta Ev \tag{40}$$
$$= Sv + \Delta Sv + TvM - (Bv + Sv + \Delta Sv - AvM) +$$
$$\Delta Ev = TvM + AvM - Bv + \Delta Ev$$

The bracketing control device 100 sends γΔEv as a shutter correction signal to the Tv/Av signal making part 10. The Tv/Av signal making part 10 combines the preset value TvM at the shutter dial and the shutter correction signal γΔEv, and supplies (TvM+γΔEv) as a Tv signal to the stop control part 13.

The output signal Tv* from the metering operation part 3 is added to the ASA signal S'V given by equation (40) and is given by:

$$Tv^* = Bv + S'v - Av^* \tag{41}$$
$$= Bv + (TvM - Bv + AvM + \Delta Ev) - Av^*$$
$$= TvM + AvM + \Delta Ev - Av^*$$

The Tv/Av signal making part 10 holds the Tv signal in step (52) upon the release operation. The stop control part 13 locks the stop when the shutter signal Tv* of equation (41) becomes equal to the shutter signal (TvM+γΔEv) from the Tv/Av signal making part 10. As a result, the output Tv* from the metering operation part 3 is given from equation (41) by:

$$Tv^* = TvM + (AvM + \Delta Ev - Av^*) \tag{42}$$
$$= TvM + \gamma \Delta Ev$$

Therefore, the Av* value upon stopping down is given by:

$$Av^* = (TvM + AvM + \Delta Ev) - (TvM + \gamma \Delta Ev) \tag{43}$$
$$= AvM + (1 - \gamma)\Delta Ev$$

The following result is obtained from equations (42) and (43). Thus, when the stop is controlled to $\{AvM+(1-\gamma)\Delta Ev\}$, the shutter control memory part 16 stores the current Tv value Tv*, or $(TvM+\gamma\Delta Ev)$ given by equation (42), and the shutter control part 17 performs shutter control in accordance with the Tv value.

In this manner, the Tv value are corrected by $\gamma\Delta Ev$ and Av value are corrected by $(1-\gamma)\cdot\Delta Ev$, respectively, and a correction amount of $\Delta Ev$ is obtained.

Figure 10:
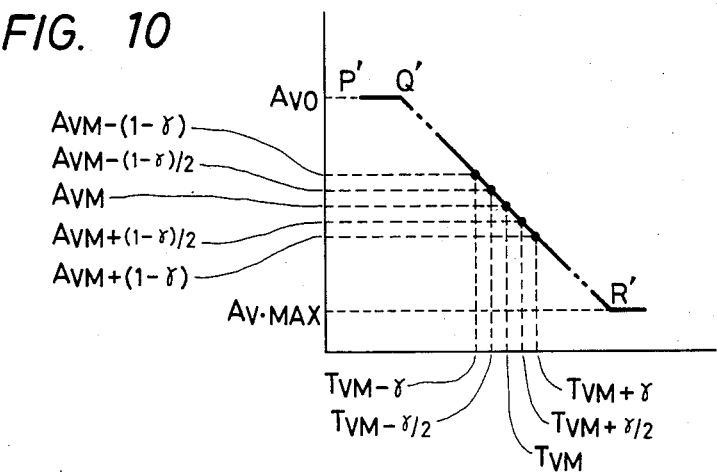

FIG. 10 shows bracketing photography in the M mode wherein the preset shutter time TvM is corrected by $\gamma\Delta Ev$ and the preset F number AvM is corrected by $(1-\gamma)\Delta Ev$.

(4-4-2) A second embodiment of the present invention will be described below with reference to FIG. 11 for the case wherein bracketing photography in the M mode is performed by correction of only the preset F number AvM.

Figure 11:
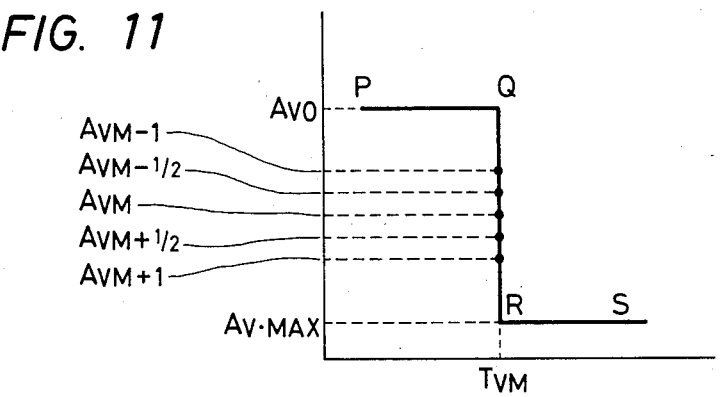
FIG. 11 is a graph for explaining bracketing photography in the M mode according to a second embodiment of the present invention.

The bracketing photography shown in FIG. 11 is performed by setting $\gamma=0$ in equations (42) and (43). In this case, equations (42) and (43) are rewritten as:

$$Tv^* = TvM \ldots \quad (44)$$

$$Av^* = AvM + \Delta Ev \ldots \quad (45)$$

As shown in FIG. 11, bracketing photography in the M mode which requires exposure correction of the preset F number AvM is suitable to a camera system wherein the stop control circuit of the camera body controls the stop to a predetermined value, as in the case of FIG. 10.

(4-4-3) A third embodiment will be described with reference to FIG. 12 for the case wherein bracketing photography is performed by correcting only the preset shutter time TvM.

Figure 12:
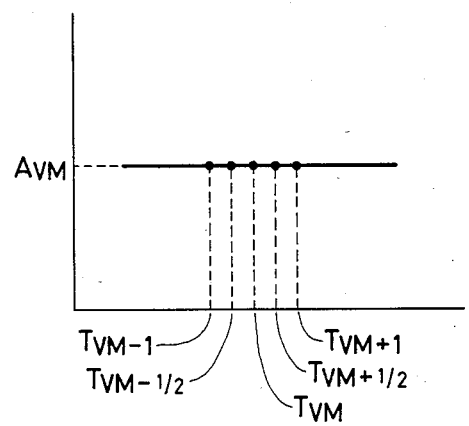
FIG. 12 is a graph for explaining bracketing photography in the M mode according to a third embodiment of the present invention.

Bracketing photography shown in FIG. 12 is performed by setting $\gamma=1$ in equations (42) and (43). In this case, equations (42) and (43) are rewritten as:

$$Tv^* = TvM + \Delta Ev \ldots \quad (46)$$

$$Av^* = AvM \ldots \quad (47)$$

Such bracketing photography is suitable to a camera system wherein the stop of the lens is mechanically locked at the preset position of the aperture ring. In this case, stop control for correcting the Av value is not performed, and exposure control is performed by correcting only the Tv value.

In order to perform such bracketing photography, the $\Delta Tv$ signal given by equation (26) is supplied to the ASA signal making part 6 through the ASA correction value combining part 22 together with the bracket signal $\Delta Ev$ from the bracketing control device 100. The ASA signal making part 62 makes an ASA signal $S'v$ given by equation (40). Upon the release operation, the signal $S'v$ is supplied to the metering operation part 3 as in other cases in the bracketing photography in the M mode.

In this bracketing photography, stop control is not performed. Therefore, the stop control part 13 is not operating, and the shutter correction signal $\gamma\Delta Ev$ need not be supplied from the bracketing control device 100 to the Tv/Av signal making part 10. Therefore, upon the release operation, the stop is mechanically locked at the F number AvM preset by the aperture ring. Therefore, the value Tv value Tv* in this case is given by:

$$Tv^* = Bv + S'v - AvM \quad (48)$$
$$= Bv + (TvM - Bv + AvM + \Delta Ev) - AvM$$
$$= TvM + \Delta Ev$$

The shutter control memory part 16 stores the Tv value given by equation (48) and the shutter control part 17 performs shutter control by the stored value. In this manner, bracketing photography by correcting only the Tv value is performed.

In the bracketing photography in the M mode described above, after the stop is locked, shutter control is performed in accordance with the value Tv obtained by metering again. However, the following system can be adopted if only the value Tv is corrected.

The bracket signal $\Delta Ev$ is directly supplied from the bracketing control device 100 to the manual time making part 18. The manual time making part 18 also receives the Tv signal TvM from the shutter dial 12 through the Tv/Av signal making part 10. The manual time making part 18 combines the signal TvM with the bracket signal $\Delta Ev$ and supplies $(TvM+\Delta Ev)$ to the shutter control part 17. The shutter control part 17 performs shutter control in accordance with this value.

In this manner, bracketing photography is performed by correcting the Tv value. In this case, the bracket signal $\Delta Ev$ need not be supplied from the device 100 to the part 22, and the signals Tv and Av need not be supplied to the part 10. The $\Delta Tv$ signal making part 24 need not also be operated.

In this manner, if the brightness of the object does not change over time, bracketing photography in each mode is performed at a predetermined exposure value and a corrected exposure value obtained by adding a correction amount $\Delta Ev$ to the predetermined exposure value.

(5) Auto-Stop Operation of Motor Drive Device

Assume bracketing photography is continuously performed by the motor drive device 200. In this case, even if the release button is kept depressed, when a number of frames set by the bracketing control device 100 are exposed, the motor drive device 200 is automatically stopped. This automatic stop operation will be described with reference to FIGS. 3 to 5.

When the switch SW3 is turned on, the motor drive device 200 is set in the continuous photography mode. A desired continuous number of bracketing photography can be set by depressing corresponding control members at the information setting part 110 of the bracketing control device 100. When the release button is depressed thereafter, the release switch SW2 is turned on upon the second stroke of the release button. Then, a signal Sig.a supplied from the release switch SW2 to the one-shot multivibrator 221 goes from H level to L level at time t1. Therefore, a set signal Sig.b of H level is supplied from the one-shot multivibrator 221 to the set input terminal of the flip-flop 226. When the release switch SW2 is turned on, an output signal Sig.c from the one-shot multivibrator 223 is kept at L level. A motor drive control signal Sig.d supplied to the E terminal from the bracketing sequence control part 130 goes to H lelel upon completion of setting at the bracketing information setting part 110, more specifically, operation of desired control members of the part 110. This signal Sig.d is kept at H level until the preset number of frames are exposed at t2. When the release switch SW2 is turned on, an output signal Sig.e from the one-shot multivibrator 224 is also at L level. Therefore, a reset signal Sig.f supplied from the OR gate 225 to the reset input terminal of the flip-flop 226 is at L level.

In response to the set signal Sig.b of H level, the flip-flop 226 supplies the release control signal Sig.g of L level to the release control part 230. Then, the release control part 230 sends a release signal to the exposure control starting part 32 of the camera through the terminal C and starts the exposure control operation of the camera. When the exposure control operation is completed, the motor control part 250 receives the exposure end signal (so-called winding signal) through the D terminal from the shutter control part 17 of the camera. Then, the part 250 drives the motor 240 to wind the film by one frame. When this winding operation is completed, the motor drive part 250 supplies a winding end signal to the release control part 230. While the release control signal Sig.g of L level is supplied to the release control part 230, the part 230 monitors the exposure end signal from the D terminal. Every time the winding end signal is received from the motor control part 250, i.e., every time step (6) is performed, the part 230 sends a release signal to the exposure control starting part 32 through the C terminal.

When a preset continuous photography number of frames are exposed, the motor drive control signal Sig.d supplied to the E terminal of the release control signal making part 220 goes from H level to L level. The output signal Sig.e from the one-shot multivibrator 224 becomes a reset signal of H level. This reset signal of H level is supplied to the reset input terminal of the flip-flop 226 through the OR gate 225. Then, release control signal Sig.g supplied from the flip-flop 226 goes from L level to H level. The release signal is not produced from the release control part 230 and release operation of the camera is inhibited when the release control signal Sig.g of H level is supplied to the release control part 23 while the switch SW2 is turned on, i.e., the release button is kept depressed. The motor drive device 200 is stopped after winding is completed. When the release button is released at a given time, e.g., at time t3, the signals Sig.a, Sig.c and Sig.f change their states. However, the motor drive device 200 remains stopped. This operation is the auto-stop operation.

When normal photography is performed without specifying bracketing photography, the operation is performed as shown at time t4 and thereafter in FIG. 5. The CPU then advances to step (216), (217) and (207), and the bracketing indication part 150 indicates that bracketing photography has been completed.

In the first embodiment, the element 1 has an exposure control means. The element 110 has a frame number setting means and a correction amount setting means. The element 130 has a control means, the element 160 has an exposure correction means, and the element 200 has a motor drive means. The element 140 has a detection means, and the element 150 has an indication means.

The apparatus shown in FIG. 1 can comprise an analog or digital circuit, or a combination thereof. The apparatus can comprise software or hardware.

In the first embodiment, the unit exposure correction amount (negative and positive step numbers) can be freely set at the bracketing information setting part 110, and the positive and negative step numbers can be separately set. Therefore, conditions for bracketing photography can be changed in accordance with the latitude of the film used.

Similarly, the continuous photography number for bracketing photography can be freely set at the bracketing information setting part 110, and the negative and positive side numbers among the continuous photography number can be separately set. Therefore, bracketing photography can be performed at will of the operator.

The bracketing information (the continuous photography number and the unit exposure correction amount) set at the part 110 are indicated by the part 150. Therefore, the operator can set the bracketing information viewing the indication part 150. Preparation for bracketing photography can be performed easily.

The motor drive device 200 can be built in the camera, or can be used as an accessory detachable from the camera.

What is claimed is:

1. A bracketing exposure control camera having exposure means for controlling an exposure operation of each of a plurality of film frames and exposure correction means for causing said exposure means to perform exposure operations of respective frames at different exposure values, comprising:

driving means for winding said film after said exposure means is operated and for operating said exposure means after a winding operation, thereby alternately performing an exposure operation and a winding operation;

frame number setting means for setting a given number of exposure frames;

control means for operating said exposure correction means and controlling said driving means so that said exposure means performs exposure operations corresponding to said given number of exposure frames set by said frame number setting means;

means for producing a frame signal indicative of a number of unexposed film frames; and detection means responsive to said frame signal for detecting that the number of exposure frames set by said frame number setting means is larger than the number of unexposed frames and for producing a detection signal.

2. A camera according to claim 1, further comprising warning means responsive to said detection signal for producing a warning signal.

3. A camera according to claim 2, wherein said warning means includes means for displaying that the number of exposure frames set by said frame number setting means is larger than the number of unexposed frames and for producing said warning signal.

4. A camera according to claim 1, further comprising correction amount setting means for setting an exposure correction amount, wherein said exposure means changes the exposure values of the exposure operations in accordance with said exposure correction amount.

5. A camera according to claim 1, further comprising means for displaying the number of frames in said given number of exposure frames which have not been exposed.

6. A camera according to claim 1, which further comprises first correction means for setting a first exposure correction amount for underexposure with respect to a predetermined exposure value and second correction means for setting a second exposure correction amount for overexposure with respect to said predetermined exposure value, wherein said exposure means performs an exposure operation to provide said predetermined exposure value and also exposure operations according to said first and second exposure correction amounts.

7. A camera according to calim 6, which further comprises means for displaying said first exposure correction amount and said second exposure correction amount.

8. A motor driving camera having exposure means for controlling an exposure operation of each of a plurality of film frames comprising:

driving means for winding said film after said exposure means is operated and for operating said exposure means after a winding operation, thereby alternately performing an exposure operation and a winding operation;

frame number setting means for setting a given number of exposure frames;

control means for controlling said driving means so that said exposure means performs exposure operations corresponding to said given number of exposure frames set by said frame number setting means;

means for producing a frame signal indicative of the number of unexposed frames of said film; and detection means responsive to said frame signal for deteting that the number of exposure frames set by said frame number setting means is larger than the number of unexposed frames and for producing a detection signal.

* * * * *